US009900566B2

United States Patent
Guo

(10) Patent No.: US 9,900,566 B2
(45) Date of Patent: Feb. 20, 2018

(54) PROJECTION DEVICE, PROJECTION SYSTEM AND METHOD FOR ADJUSTING PROJECTION BRIGHTNESS OF PROJECTION SYSTEM

(71) Applicant: Qiangdao Hisense Electronics Co., Ltd., Qingdao, Shandong (CN)

(72) Inventor: Xiaowei Guo, Shandong (CN)

(73) Assignee: Qingdao Hisense Electronics Co., Ltd., Qingdao, Shangdong (CN)

( * ) Notice: Subject to any disclaimer, the term of this patent is extended or adjusted under 35 U.S.C. 154(b) by 0 days.

(21) Appl. No.: 14/978,943

(22) Filed: Dec. 22, 2015

(65) Prior Publication Data
US 2016/0269701 A1    Sep. 15, 2016

(30) Foreign Application Priority Data
Mar. 11, 2015    (CN) .......................... 2015 1 0105127

(51) Int. Cl.
*H04N 9/31* (2006.01)
*G03B 21/14* (2006.01)

(52) U.S. Cl.
CPC ......... *H04N 9/3182* (2013.01); *H04N 9/3155* (2013.01); *G03B 21/147* (2013.01); *H04N 9/3147* (2013.01)

(58) Field of Classification Search
CPC .. H04N 9/3147; H04N 9/3179; H04N 9/3182; H04N 9/3194; G03B 21/147; G03B 21/14
See application file for complete search history.

(56) References Cited

U.S. PATENT DOCUMENTS 6,219,011 B1 *   4/2001   Aloni ..................... G06F 3/147
                                                    345/1.3
2009/0091623 A1 *  4/2009  Krogstad ............... G03B 21/53
                                                    348/189
(Continued)

FOREIGN PATENT DOCUMENTS

CN   1613103 A    5/2005
CN   101017315 A   8/2007
(Continued)

OTHER PUBLICATIONS

First Chinese Office Action to Chinese Application No. 201510105127.4 dated Jan. 14, 2016 along with English Translation, (8p).

*Primary Examiner* — Ryan Howard
(74) *Attorney, Agent, or Firm* — Brinks Gilson & Lione

(57) ABSTRACT

The present disclosure provides a projection device, a projection system and a method for adjusting projection brightness of the projection system. The method includes: projecting, by a projection unit of each projection device, an image on a projection plane corresponding to the projection unit separately; collecting, by a brightness collecting device, brightness information on the projection planes separately, and sending the brightness information to the projection device; receiving, by a processing unit, the brightness information, and obtaining an actual brightness value of projection of the projection device after processing the brightness information; determining whether the actual brightness value is within a preset brightness value range of the projection device; when the actual brightness value is not within the preset brightness value range; adjusting, by a brightness adjusting unit, the projection brightness of the projection device until the actual brightness value falls within the preset brightness value range.

15 Claims, 5 Drawing Sheets

(56) References Cited

U.S. PATENT DOCUMENTS

2010/0208216 A1* 8/2010 Hirabayashi ........... G03B 21/14
  353/85
2011/0310354 A1 12/2011 Fujimori et al.

FOREIGN PATENT DOCUMENTS

| CN | 101136181 | A | 3/2008 |
| CN | 102662295 | A | 9/2012 |
| CN | 102749794 | A | 10/2012 |
| CN | 104065901 | A | 9/2014 |
| CN | 104363399 | A | 2/2015 |
| JP | 2012003041 | A | 1/2012 |
| JP | 2014224841 | | 12/2014 |

* cited by examiner

PROJECTION DEVICE, PROJECTION SYSTEM AND METHOD FOR ADJUSTING PROJECTION BRIGHTNESS OF PROJECTION SYSTEM

PRIORITY STATEMENT

This application claims the priority benefit of Chinese Patent Application No. 201510105127.4 filed on Mar. 11, 2015, the disclosure of which is incorporated herein in its entirety by reference.

BACKGROUND

The present disclosure relates to the field of projection technology, and in particular to a projection device, a projection system and a method for adjusting projection brightness of a projection system.

RELATED ART

In large exhibitions generally there will be visual displays, such as videos, on a large screen. In order to achieve higher visual impact and more information transmission for a visual display, an organizer of an exhibition often uses multiple projectors, each project part of the image of a video on a screen. However, when multiple projectors work together, because projection brightness of the projectors is different, the brightness of the images from different projectors is not uniform so that the viewing experience is affected.

The current solution is to manually adjust the brightness of each projector to make the image brightness of each projector basically the same. However, this method needs to cost much time for manual adjustment at every projection, and because human eyes have subjective differences, the final effect after the adjustment is only relatively uniform. To solve this problem, the existing technology provides a method that can automatically adjust brightness of a single projector. In this method, an optical sensor is disposed on a projector to collect the brightness of ambient light. According to the brightness of ambient light, projection brightness of the projector is adjusted automatically so that the projection brightness becomes higher when the brightness of ambient light is high and becomes lower when the brightness of ambient light becomes low. However, this method can only adjust projection brightness of a single projector according to the ambient light, but cannot make multiple projectors have uniform projection brightness. Besides, when multiple projectors are used together, especially for large occasions, the environment where each projector is located is quite different. Even though the above brightness adjustment is performed on each projector, the brightness of the stitched images may be not satisfying.

SUMMARY

The present disclosure provides a projection device, a projection system and a method for adjusting projection brightness of a projection system, which solve the problem in the existing technology that the brightness adjustment effect of a stitched image is not uniform.

In order to solve the above problem, the present disclosure discloses a projection device, including a projection unit, configured to project an image on a projection plane; a processing unit, configured to receive brightness information collected by a brightness collecting device disposed on the projection plane, obtain an actual brightness value of projection of the projection device after processing the brightness information, and determine whether the actual brightness value is within a preset brightness value range; and a brightness adjusting unit, configured to: when the actual brightness value is not within the preset brightness value range, adjust the projection brightness of the projection unit until the actual brightness value falls within the preset brightness value range.

In another aspect, the present disclosure also discloses a projection system, including: at least two projection planes, configured to display a projected image; at least two brightness collecting devices, configured to collect brightness information on the projection planes; and at least two projection devices, where the projection planes, the brightness collecting devices and the projection devices are a one-to-one correspondence, the brightness collecting devices are disposed on the corresponding projection planes; any of the projection devices including: a projection unit, configured to project an image on the projection plane corresponding to the projection device; a processing unit, configured to receive brightness information collected by the brightness collecting device corresponding to the projection device, obtain an actual brightness value of projection of the projection device after processing the brightness information, and determine whether the actual brightness value is within a preset brightness value range; and a brightness adjusting unit, when the actual brightness value is not within the preset brightness value range, configured to adjust projection brightness of the projection device until the actual brightness value falls within the preset brightness value range.

Further, the projection system also includes an infrared emitter, where the brightness collecting device sends the collected brightness information to the processing unit through the infrared emitter, and the processing unit includes an infrared receiver configured to receive the brightness information.

Further, the brightness collecting device is fixedly or movably arranged on the corresponding projection plane.

In still another aspect, the present disclosure also discloses a method for adjusting projection brightness of a projection system, where the projection system includes at least two projection planes, at least two brightness collecting devices and at least two projection devices, the projection planes, the brightness collecting devices and the projection devices are a one-to-one correspondence, and the brightness collecting devices are on the corresponding projection planes; any of the projection devices including a projection unit, a processing unit and a brightness adjusting unit; the method including the following steps: projecting, by the projection unit of each projection device, an image on a projection plane corresponding to the projection unit separately; collecting, by each brightness collecting device, brightness information on the projection plane corresponding to the brightness collecting device separately and sending the brightness information to each projection device; receiving, by the processing unit of the projection device, the brightness information collected by the brightness collecting device corresponding to the projection device; obtaining an actual brightness value of projection of the projection device after processing the brightness information, and determining whether the actual brightness value is within a preset brightness value range of the projection device; adjusting, by the brightness adjusting unit, the projection brightness of the projection device until the actual brightness value falls within the preset brightness value range when the actual brightness value is not within the preset brightness value range.

Further, the collecting, by each brightness collecting device, the brightness information on the projection plane corresponding to the brightness collecting device separately and the sending the brightness information to each projection device comprise: sending, by the brightness collecting device, the collected brightness information to the projection device by means of infrared transmission.

Further, the collecting, by each brightness collecting device, brightness information on the projection plane corresponding to the brightness collecting device separately and the sending the brightness information to each projection device include: the brightness information including an identifier of the projection device.

Further, the receiving, by the processing unit of the projection device, the brightness information collected by the brightness collecting device corresponding to the projection device, and the obtaining an actual brightness value of projection of the projection device after processing the brightness information include: identifying, by the processing unit, whether the brightness information is from the brightness collecting device corresponding to the projection device according to the identifier.

Further, the projection devices have the same preset brightness value range.

Further, the preset brightness value range is a specific value; the determining whether the actual brightness value is within the preset brightness value range of the projection device includes: dividing the brightness of the projection device into N levels from the darkest to the brightest; determining whether a level corresponding to the actual brightness value is equal to a level corresponding to the specific value; when the actual brightness value is not within the preset brightness value range, adjusting, by the brightness adjusting unit, projection brightness of the projection device until the actual brightness value falls within the preset brightness value, including: when the level corresponding to the actual brightness value is not equal to the level corresponding to the specific value, calculating a difference X between the level corresponding to the actual brightness value and the level corresponding to the specific value; if the level corresponding to the actual brightness value is greater than the level corresponding to the specific value, controlling, by the brightness adjusting unit, a current output to the projection unit to reduce the current by X/N; if the level corresponding to the actual brightness value is less than the level corresponding to the specific value, controlling, by the brightness adjusting unit, a current output to the projection unit to increase the current by X/N.

Compared with the existing technology, the present disclosure has the following advantages:

In the present disclosure, after collecting the brightness information on the corresponding projection plane, the brightness collecting device sends the brightness information to the processing unit, the processing unit obtains the actual brightness value of the projection plane corresponding to the projection device after the processing unit processes the brightness information, and determines whether the actual brightness value is within the preset brightness value range of the projection device. If the actual brightness value is not within the preset brightness value range, the brightness adjusting unit adjusts projection brightness of the projection device until the actual brightness value falls within the preset brightness value range. In this way, the brightness collecting device on the projection plane may collect the actual projection brightness of the projection device corresponding to the brightness collecting device accurately, so that the ambient light does not influence the projection brightness. By controlling the actual projection brightness of each projection device within the preset brightness value range, the projection system can adjust projection brightness of all projection devices to an even range automatically. The preset brightness value range can be set as needed. The adjusting effect is good.

By controlling the actual projection brightness of each projection device within the preset brightness value range, the projection system can adjust projection brightness of all projection devices to an even range automatically. The preset brightness value range can be set as needed. The adjusting effect is good.

DETAILED DESCRIPTION

To make the objectives, features and advantages of the present disclosure more comprehensible, the present disclosure is described in the following in more detail with reference to the exemplary embodiments and the accompanying drawings.

Figure 1:
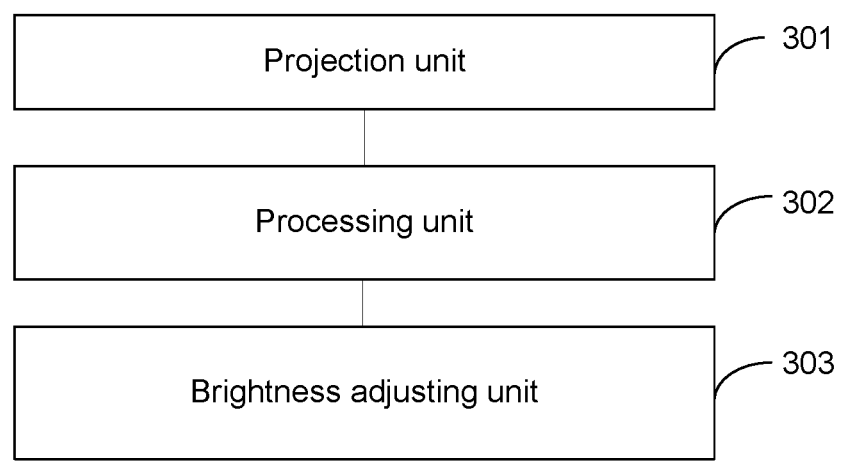
FIG. 1 is a structural block diagram of a projection device according to an exemplary embodiment of the present disclosure.

FIG. 1 is a structural block diagram of a projection device according to an exemplary embodiment of the present disclosure. The projection device includes a projection unit 301, a processing unit 302 and a brightness adjusting unit 303.

The projection unit is configured to project an image on a projection plane, and includes a light source, a lens and other parts.

The processing unit receives brightness information collected by a brightness collecting device disposed on the projection plane, obtains an actual brightness value of projection of the projection device after processing the brightness information, and determines whether the actual brightness value is within a preset brightness value range.

The brightness adjusting unit is configured to: when the actual brightness value is not within the preset brightness value range, adjust the projection brightness of the projection unit until the actual brightness value falls within the preset brightness value range.

Figure 2:
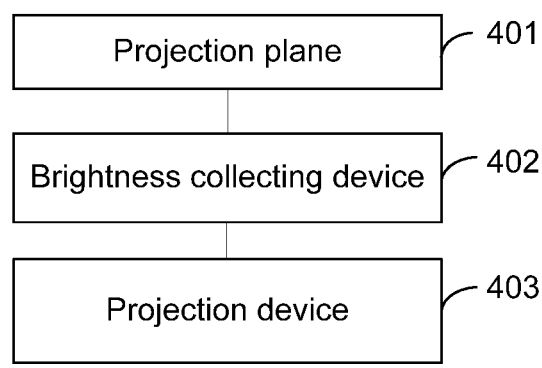
FIG. 2 is a structural block diagram of a projection system according to an exemplary embodiment of the present disclosure.

FIG. 2 is a structural block diagram of a projection system according to an exemplary embodiment of the present disclosure. The projection system includes at least two projection planes 401, at least two brightness collecting devices 402 and at least two projection devices 403, where the projection planes are configured to display the projected image, and the brightness collecting devices are configured to collect the brightness information on the projection planes. The projection planes, the brightness collecting devices and the projection devices are a one-to-one correspondence, and the brightness collecting devices are disposed on the corresponding projection planes.

The projection device may be a projector based on an LED light source or a laser light source, and may be an optical projector or a digital projector. For example, the projection device may be the projection device shown in FIG. 1. However, the present disclosure is not limited thereto. Any projector that can project light and display an image on the projection plane is applicable in the present disclosure.

The at least two projection devices of the present disclosure may be the same type or different types. In an exemplary embodiment, these projection devices may have the same resolution. For example, all projectors may have the resolution of 1024 (pixel width)*768 (pixel height). However, other contrast and resolution may also be used.

The projection plane may be any object surface satisfying the projection condition such as a dedicated screen for a projector or wall. The projection planes and the projection devices are a one-to-one correspondence, so the present disclosure has multiple projection planes. Positions of these projection planes can be set as needed. To facilitate the projected image stitching, the projection surfaces may be disposed adjacently.

The brightness collecting device is configured to collect the brightness of the light that the projection device projects on the projection plane, and may be a brightness sensor such as a phototransistor or a photodiode. Each projection plane is corresponding to one brightness collecting device. In order to collect the brightness information of the projection plane accurately, the brightness collecting device is disposed on the corresponding projection plane, and further, the brightness collecting device is disposed at the central position of the projection plane. When the number and positions of the projection devices are relatively fixed, the brightness collecting devices may be embedded and fixed at fixed positions on the projection planes. When the number and positions of the projection devices need to be changed, the brightness collecting devices may be movable disposed at any position on the projection planes. Comparatively, the positions and number of the former are not flexible enough, but the cost is relatively low, which can meet the requirements of most customers; the positions and number of the latter are flexible, but the cost is relatively high, which is applicable to certain customers with special needs.

Further, the projection system also includes an infrared emitter, and the brightness collecting device sends the collected brightness information to the processing unit through the infrared emitter; the processing unit includes an infrared receiver configured to receive the brightness information. The projection system of the present disclosure may also include a single-chip microcomputer, configured to be connected to each brightness collecting device, read a brightness information register of each brightness collecting device collectively to obtain the brightness information, obtain a signal suitable for infrared transmission after processing, and transmit the brightness information to the infrared emitter collectively.

After receiving the brightness information sent by the infrared emitter, the processing unit performs amplification, filtering and calculation processing, and obtains the actual brightness value of the projection plane. It should be noted that the processing unit may be a CPU integrated within the projection device. After receiving the brightness information collected by all brightness collecting devices and sent by the single-chip microcomputer, any projection device identifies (referring to the exemplary embodiment for specific identifying method) the brightness information of the projection plane corresponding to the projection device.

The brightness adjusting unit may adjust projection brightness of the projection device by adjusting the current flowing through the light source, so the original circuit part of the projection device can be reused to simplify the structure and save cost.

Figure 3:
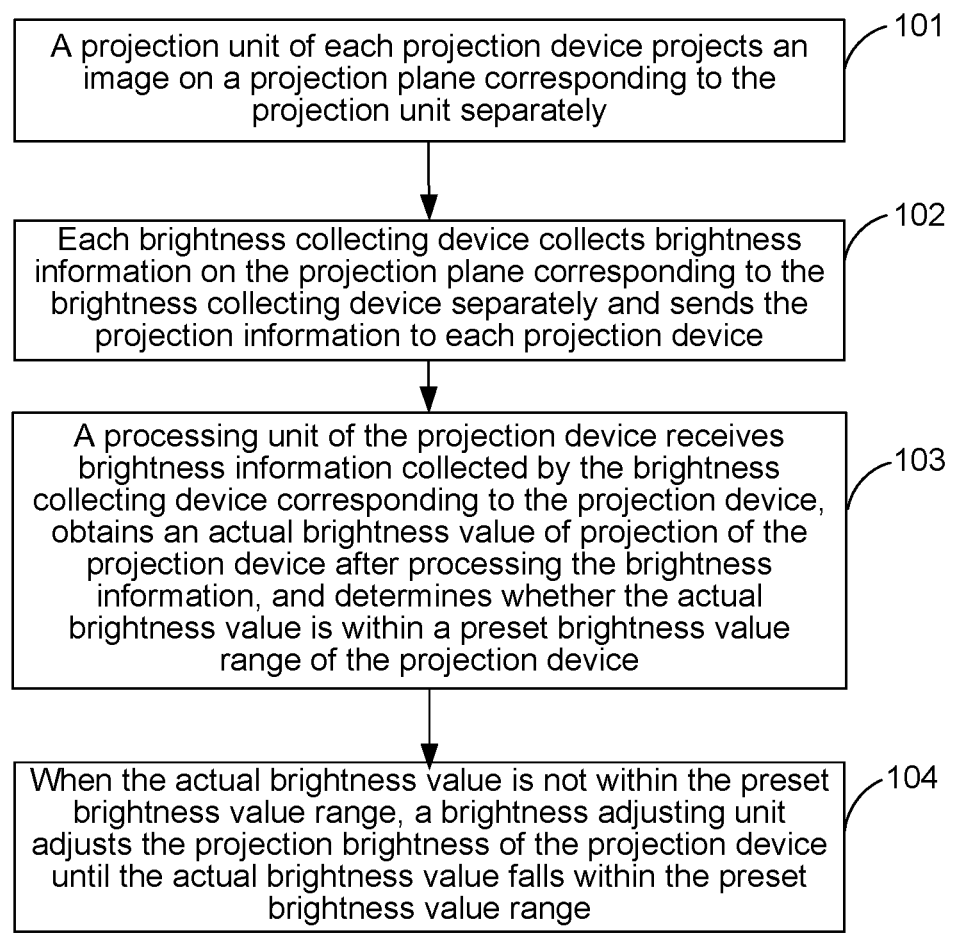
FIG. 3 is a schematic flowchart of a method for adjusting projection brightness of a projection system according to an exemplary embodiment of the present disclosure.

FIG. 3 shows a method for adjusting brightness of a projection system according to an exemplary embodiment of the present disclosure. The method may be implemented by a projection system, such as the projection system shown in FIG. 2. The projection system may include one or more projection devices. Each projection device may correspond with a projection plane and a brightness collecting device. Further, the method may include the following steps:

101. A projection unit of each projection device projects an image on a projection plane corresponding to the projection unit separately.

It should be noted that the projected image may be any image or a preset image. A solid color image may be used.

102. Each brightness collecting device collects the brightness information on the projection plane corresponding to the brightness collecting device separately and sends the projection information to each projection device.

In the present disclosure, the brightness collecting devices, the projection devices and the projection planes are a one-to-one correspondence. The brightness collecting device collects the brightness information of the projection plane corresponding to the brightness collecting device, which is corresponding to the actual projection brightness of the projection of the projection device on this projection plane.

103. A processing unit of each of the projection device receives the brightness information collected by the brightness collecting device corresponding to the projection device, obtains an actual brightness value of the projection of the projection device after processing the brightness information, and determines whether the actual brightness value is within a preset brightness value range of the projection device.

In an exemplary embodiment, the brightness collecting device transmits the collected brightness information to the processing unit by means of infrared transmission. As described above, a single-chip microcomputer can obtain the brightness information collected by all brightness collecting devices collectively, and send the brightness information to the processing unit through the infrared emitter. In an exemplary embodiment, the processing unit is a CPU integrated within the projection device, that is, the CPU of each projection device receives the brightness information transmitted by the single-chip microcomputer through an infrared receiver. In order to enable the CPU to identify the brightness information corresponding to the projection device, the brightness information includes an identifier of the projection device corresponding to the brightness collecting device. By comparing whether the identifier is the same as a preset identifier of the projection device, it can be determined whether the brightness information is the brightness information collected by the brightness collecting device corresponding to the projection device.

The processing unit determines whether the actual brightness value of the projection plane falls within the preset brightness value range. The preset brightness value range is an expected projection brightness range preset by a user. In order to make the brightness of the stitched image more uniform, according to an exemplary embodiment, all the projection devices have the same preset brightness value range (e.g., a reference bright value range). Alternatively, the reference brightness value range may also be a dynamically determined value. For example, the reference brightness value may be an even value of all individual brightness values of the one or more projection device.

104. When the actual brightness value is not within the preset brightness value range, a brightness adjusting unit adjusts projection brightness of the projection device until the actual brightness value falls within the preset brightness value range.

As the sensibility to brightness of human eyes is limited, the preset brightness value range may be a numerical range. The numerical range can be set according to the actual situation. Certainly, the preset brightness value range may also be a specific value to make the final adjusted brightness more precise. At this time, the processing unit can compare the actual brightness value of the projection plane with the specific value. If the actual brightness value is less than the specific value, the projection device is adjusted brighter to make the projection brightness value of the projection device equal to the specific value. If the actual brightness value is greater than the specific value, the projection device is adjusted darker to make the projection brightness value of the projection device equal to the specific value. To facilitate calculation of the processing unit, the brightness of the projector can be divided into N levels from the darkest to the brightest, such as 256 levels. In order to achieve automatic brightness adjustment in one step, the level corresponding to the actual brightness of the projection plane is compared with the level corresponding to the specific value to obtain a difference (X). If the level corresponding to the actual brightness is greater than the level corresponding to the specific value, the CPU controls the current output to the projection unit to reduce the current by X/256. If the level corresponding to the actual brightness is less than the level corresponding to the specific value, the CPU controls the current output to the projection unit to increase the current by X/256.

In the present disclosure, after collecting the brightness information on the corresponding projection plane, the brightness collecting device sends the brightness information to the processing unit, and the processing unit obtains the actual brightness value of the projection plane corresponding to the projection device after processing the brightness information, and determines whether the actual brightness value is within the preset brightness value range of the projection device. If the actual brightness value is not within the preset brightness value range, the brightness adjusting unit adjusts projection brightness of the projection device until the actual brightness value falls within the preset brightness value range. In this way, the brightness collecting device on the projection plane can collect the actual projection brightness of the projection device corresponding to the brightness collecting device accurately, so that the ambient light does not influence the projection brightness. By controlling the actual projection brightness of each projection device within the preset brightness value range, the projection system can adjust projection brightness of all projection devices to an even range automatically. The preset brightness value range can be set as needed. The adjusting effect is good.

Exemplary Embodiment

Figure 4:
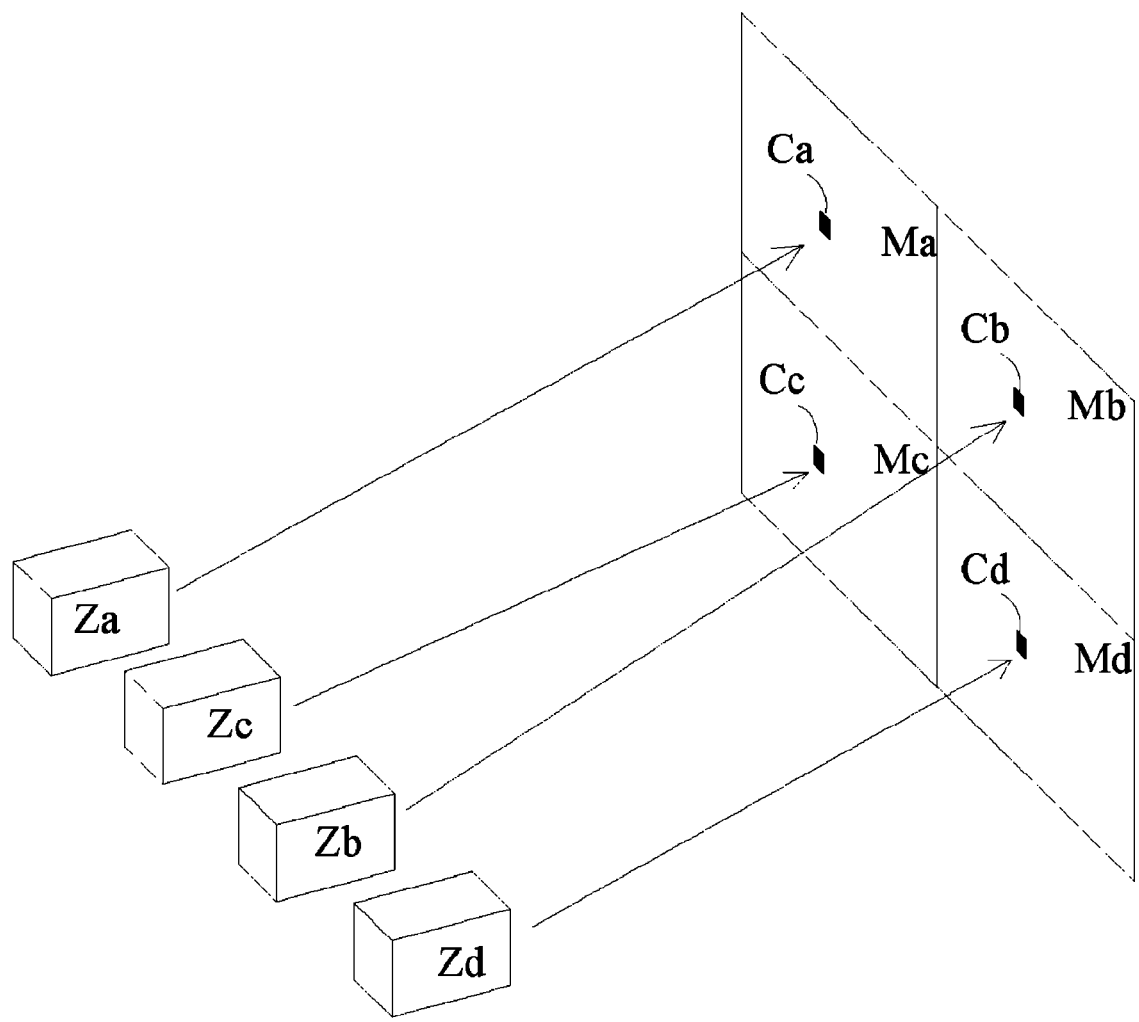
FIG. 4 is a schematic structural diagram of a projection system according to an exemplary embodiment of the present disclosure.
Figure 5:
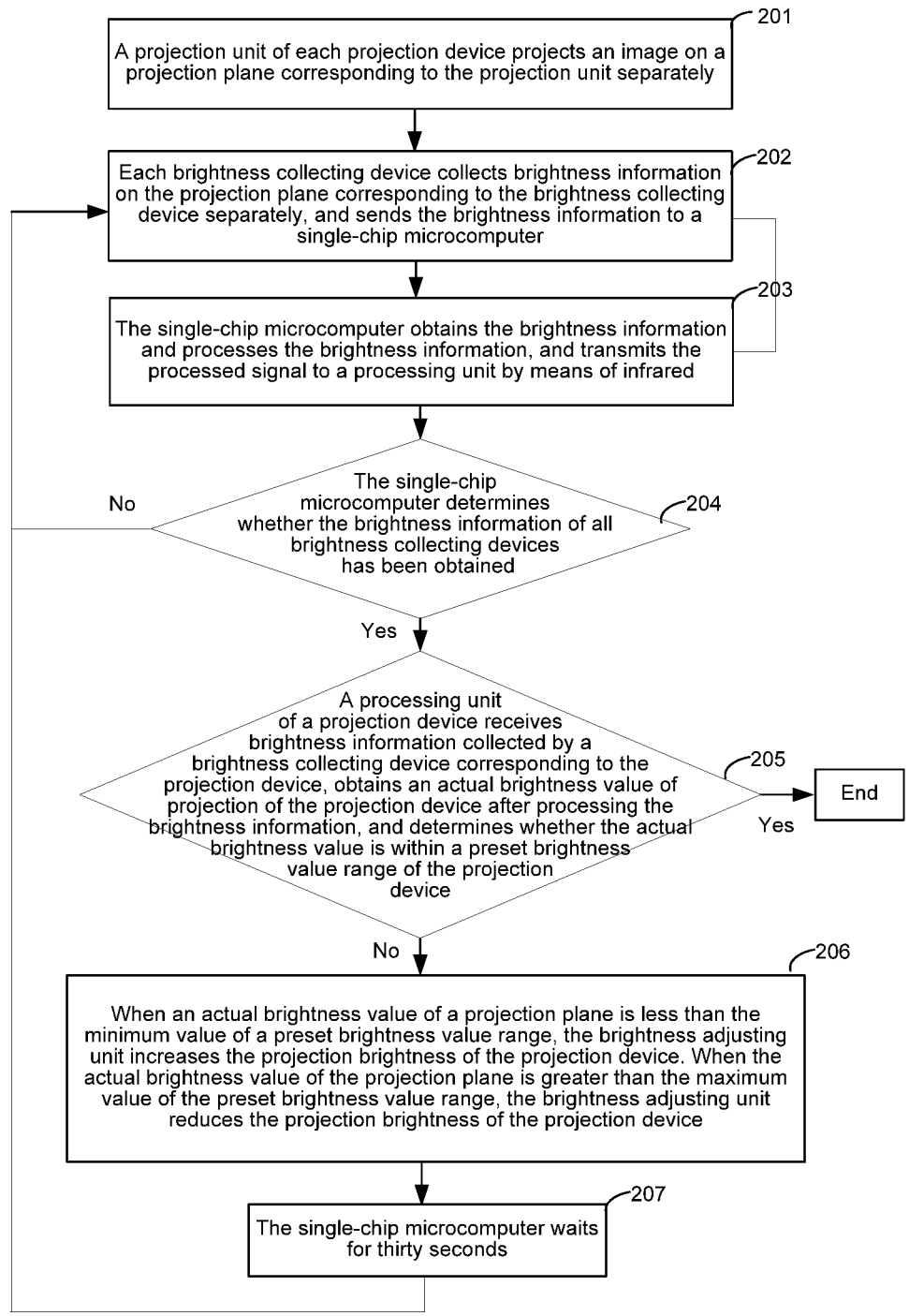
FIG. 5 is a schematic flowchart of a method for adjusting projection brightness of a projection system according to another embodiment of the present disclosure.

FIG. 4 is a schematic structural diagram of a projection system according to an exemplary embodiment of the present disclosure. Referring to FIG. 4, in this embodiment, the projection system includes four projection devices: Za, Zb, Zc and Zd; four brightness collecting devices: Ca, Cb, Cc and Cd; and four projection planes: Ma, Mb, Mc and Md. They are a one-to-one correspondence. A processing unit is a CPU integrated within the projection device. In addition, the projection system also includes a single-chip microcomputer (not shown in the drawing). The single-chip microcomputer is connected to all brightness collecting devices. FIG. 5 is a schematic flowchart of a method for adjusting projection brightness of a projection system according to an exemplary embodiment of the present disclosure. Referring to FIG. 5, the method specifically includes the following steps:

201. A projection unit of each projection device projects an image on a projection plane corresponding to the projection unit separately.

For a specific process, reference may be made to step 101, which is not elaborated here.

202. Each brightness collecting device collects brightness information on the projection plane corresponding to the brightness collecting device separately, and sends the brightness information to a single-chip microcomputer.

203. The single-chip microcomputer obtains the brightness information and processes the brightness information, and transmits the processed signal to a processing unit by means of the infrared.

Figure 6:
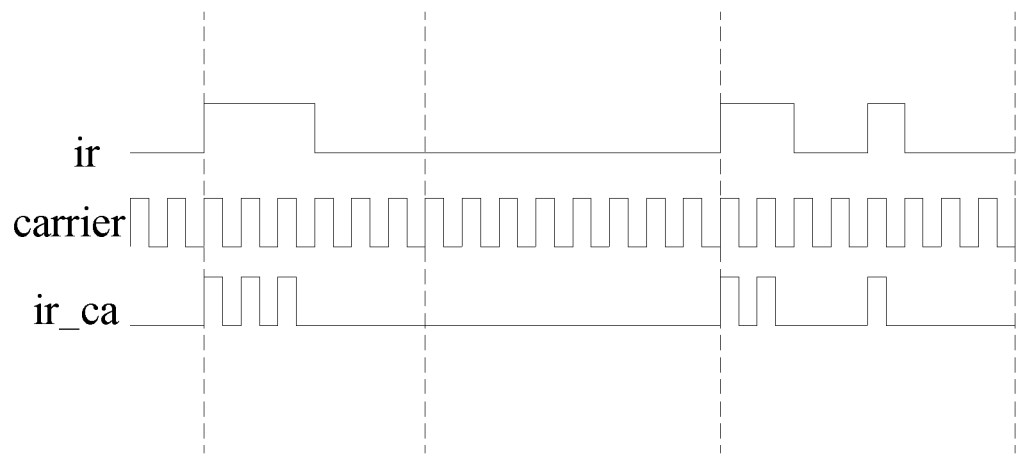
FIG. 6 is a schematic waveform diagram of brightness information according to an exemplary embodiment of the present disclosure.

Specifically, the brightness collecting device Ca is used as an example. After receiving the information collected by the brightness collecting device Ca, the single-chip microcomputer processes the information and generates a format suitable for infrared transmission. Refer to FIG. 6 for the waveform ir, in which 1 represents a high level, and 0 represents a low level. 111000 whose initial length is 6 bits represents an infrared start code, which is followed by an identifier of the projection device Za whose length is 8 bits, and then a brightness value collected by the brightness collecting device Ca whose length is 8 bits appears at last. Because the frequency of the infrared transmission signal is too low, and can be interfered with easily, in general the infrared transmission signal needs to be superposed onto a carrier. The frequency of the carrier in this embodiment is 38 kHZ, that is, the waveform carrier in FIG. 6. The waveform ir_ca is the waveform after the carrier superposition, where the identifier of the projection device Za is 0x00, and the collected brightness value is 0xc8.

Figure 7:
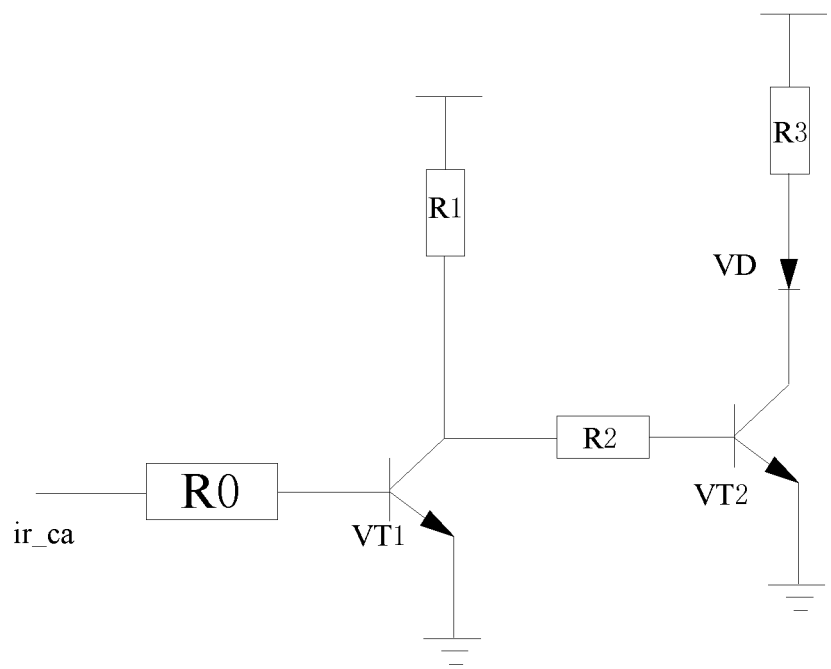
FIG. 7 is a schematic circuit diagram of an infrared emitter according to an exemplary embodiment of the present disclosure.

The single-chip microcomputer sends the infrared signal after the carrier superposition to an infrared emitter. FIG. 7 is a schematic circuit diagram of the infrared emitter. Referring to FIG. 7, the infrared emitter includes two transistors VT1 and VT2; four resistors R0, R1, R2 and R3; and an infrared diode VD. A base of the transistor VT1 is connected to an input signal through the resistor R0. An emitter of VT1 is connected to the ground. A collector of VT1 is connected to a power source through the resistor R1, and is connected to a base of the transistor VT2 through the resistor R2. An emitter of the transistor VT2 is connected to the ground. A collector of VT 2 is connected to a negative pole of the infrared diode VD. A positive pole of the infrared diode VD is connected to the power source through the resistor R3. The infrared signal ir_ca after the carrier superposition is sent to the base of the transistor VT1. When the infrared signal is a low level, the transistor VT1 is cut off, and the base of the transistor VT2 is a high level. Therefore, at this time, the transistor VT2 is conducted, and the infrared diode VD sends the infrared signal. When the infrared signal ir_ca is a high level, the transistor VT1 is conducted, and the base of the transistor VT2 is a low level. Therefore, at this time, the transistor VT2 is cut off, and the infrared diode VD does not send the infrared signal.

204. The single-chip microcomputer determines whether the brightness information of all brightness collecting devices has been obtained. If the brightness information of all brightness collecting devices has not been obtained, return to step 202. If the brightness information of all the brightness collecting devices has been obtained, perform step 205.

After sending the brightness information collected by the brightness collecting device Ca, the single-chip microcomputer waits for one second, and then reads the brightness information collected by the next brightness collecting device Cb. The time of waiting is to separate the two infrared signals to prevent receiving errors. Certainly, the time may also be set to other values. When the brightness information collected by the brightness collecting device Cb is processed, the process is as described above, which is not elaborated hereby the identifier of the projection device, the single-chip microcomputer may determine whether the brightness information of all brightness collecting devices has been obtained.

205. A processing unit of a projection device receives brightness information collected by a brightness collecting device corresponding to the projection device, obtains an actual brightness value of projection of the projection device after processing the brightness information, and determines whether the actual brightness value is within a preset brightness value range of the projection device. If the actual brightness value is within the preset brightness value range of the projection device, the process is completed. If the actual brightness value is not within the preset brightness value range of the projection device, perform step 206.

It should be noted that, the processing unit obtains the brightness information collected by all brightness collecting devices, and by comparing the identifier of the projection device, the brightness information corresponding to the projection device can be identified.

The processing unit includes the infrared receiver configured to receive the brightness information. It should be noted that, currently the infrared receivers available on the market are generally integrated infrared receivers. Signal processing circuits such as a monitoring diode, an amplifier, a filter, an integrator circuit and a comparator are integrated in the integrated infrared receiver, so that the infrared receiver can directly send out the signal after the carrier superposition through an output pin.

Because the signal output by the integrated infrared receiver is in opposite phase to the received signal, in the projection device, the high and low level of the data received by the CPU is opposite to the high and low level of the signal sent out by the infrared emitter. However, because two transistors are used in the circuit of the infrared emitter, the signal sent to the infrared emitter by the single-chip microcomputer is opposite to the signal actually sent out by the infrared emitter, so in the projection device, a phase of the signal received by the CPU is the same as a phase of the signal sent out by the single-chip microcomputer.

The CPU locates the start code of the address and the data by using three high levels and three low levels. Then the identifier of the projection device and the collected projection brightness are read. If the identifier of the projection device is the same as the identifier of this projection device, the projection brightness is recorded.

206. When an actual brightness value of a projection plane is less than the minimum value of a preset brightness value range, the brightness adjusting unit increases the projection brightness of the projection device. When the actual brightness value of the projection plane is greater than the maximum value of the preset brightness value range, the brightness adjusting unit reduces the projection brightness of the projection device.

It should be noted that, each adjustment of the brightness value may be set as needed. During the process that the brightness adjusting unit adjusts the projection brightness according to the collected brightness value, it is possible that projection brightness does not match perfectly for once. Therefore, multiple measurements and adjustments are needed for exact match. However, the more times the adjustments are performed, the longer the needed time is, so the configuration of this value can be set according to actual needs.

207. After the single-chip microcomputer waits for thirty seconds, return to step 202.

After all the projection devices complete the first round of brightness adjustment, the single-chip microcomputer enters a thirty-second waiting state. This process is to leave enough time for the stabilization of the states of all projectors and the stabilization of projection brightness on the projection planes, so that in the second round the brightness collecting devices can collect the accurate brightness information to prevent the brightness error caused by the unstable state of the projection and to prevent the wrong adjustment of the projectors in the next round of the adjustment.

The exemplary embodiments of the present disclosure guarantee that the projection system can automatically adjust projection brightness of all projection devices. The preset brightness value range can be set as needed, and the adjustment effect is good.

The present disclosure is described in detail above. In the specification, specific examples are used to illustrate the principle and implementation manners of the present disclosure. The above embodiments are only used to help understand the methodology and concept of the present disclosure. Persons of ordinary skill in the art can make variation to the specific implementation manners and application scope according to the idea of the present disclosure. In conclusion, the content of this specification should not be understood as a limitation to the present disclosure.

The invention claimed is:

1. A projection system, comprising:
a common wireless emitter; and
at least one projection device, each in communication with the common wireless emitter, wherein a first projection device of the at least one projection device includes:
a projection unit, configured to project an image on a projection plane;
a brightness collecting device;
a brightness sensor for detecting light collected by the brightness collecting device and in communication with the common wireless emitter, wherein the common wireless emitter generates a collective wireless signal containing a timed sequences, each sequence being associated with one of detected light level at the brightness sensor of the first projection device and detected light levels at brightness sensors of all other of the at least one projection device;
a wireless receiver configured to receive the collective wireless signal by the common wireless emitter; and
a processing unit, configured to:
receive the collective wireless signal;
identify from the collective wireless signal a sequence associated with the first projection device; obtain an actual brightness value of projection of the first projection device by processing the identified sequence; and
determine whether the actual brightness value is within a reference brightness value range; and
a brightness adjusting unit, configured to control the projection unit to adjust projection brightness of the image on the projection plane so that the actual brightness value falls within the reference brightness value range.

2. The projection system according to claim 1, wherein the brightness collecting device of the first projection device is disposed on the projection plane.

3. The projection system according to claim 2, wherein the projection unit of the first projection device is configured to project the image as a first portion of a target image on the projection plane and another projection device of the at least one projection device is configured to project a second portion of the target image.

4. The projection system according to claim 3, wherein the brightness collecting device of the first projection device is fixedly arranged on the projection plane corresponding to the first portion of the target image.

5. The projection system according to claim 3, wherein the brightness collecting device of the first projection device is movably arranged on the projection plane corresponding to the first portion of the target image.

6. The projection system according to claim 1, wherein the collective wireless signal is carried by infrared light.

7. The projection system according to claim 1, wherein the reference brightness value range is a preset brightness value range.

8. The projection system according to claim 1, wherein the reference brightness value range is associated with an average value of brightness value of the first projection device.

9. The projection system according to claim 2, wherein the brightness sensor is disposed on the projection plane.

10. A method for adjusting projection brightness of a projection system including a plurality of projection devices each configured to project a portion of a target image on a corresponding portion of a projection plane, a plurality of brightness collecting devices corresponding to the plurality of projection device and disposed on the corresponding portion of the projection plane, a plurality of wireless receivers corresponding to the plurality of projection devices, and a wireless emitter common to the plurality of projection devices, the method comprising:
projecting, by a first projection device of the plurality of projection devices, an image on the corresponding portion of the projection plane;
collecting, by a first brightness collecting device corresponding to the first projection device, a first brightness information of the first projection device in projecting the image on the corresponding portion of the projection plane;
generating by the wireless emitter a collective wireless signal containing timed sequences, each sequence associated with one of the first brightness information of the first projection device and brightness information corresponding to all other of the plurality of projection device;
receiving, by a first wireless receiver of the plurality of wireless receivers corresponding to the first projection device, the collective wireless signal;
identifying, by the first wireless receivers from the timed sequences in the collective wireless signal, a sequence corresponding to the first projection device;
obtaining, by the first projection device, actual brightness value of projection of the first projection device based on the identified sequence; and
adjusting projection brightness of the first projection device so that the actual brightness value of the first projection device falls within a reference brightness value range.

11. The method according to claim 10, wherein the wireless signal is carried by infrared light.

12. The method according to claim 11, wherein the sequence of the timed sequences corresponding to the first projection device comprises an identifier of the first projection device.

13. The method according to claim 12, wherein identifying from the collective wireless signal a sequence corresponding to the first projection device comprises: identifying, by the first wireless receiver from the timed sequences in the collective wireless signal, a sequence corresponding to the first projection based on the identifier for the first projection device.

14. The method according to claim 10, wherein the plurality of projection devices has the same reference brightness value range.

15. A method for adjusting projection brightness of a projection system, wherein the projection system comprises:
a plurality of projection devices, each projection device configured to project an image as a portion of a target image;
a plurality of brightness collecting devices, corresponding to the plurality of projection device, disposed on a corresponding portion of a projection plane; and
the method comprising, by a first projection device of the plurality of project devices:
projecting the image on the corresponding portion of the projection plane;
collecting corresponding brightness information by the corresponding brightness collection device from the corresponding portion of the projection plane;
receiving the corresponding brightness information from the corresponding brightness collecting device;
obtaining an actual brightness value of projection corresponding to the first projection device based on the corresponding brightness information;
dividing an operation brightness range of the first projection device into N levels of brightness from the darkest to the brightest;
determining an actual brightness level among the N levels of brightness corresponding to the actual brightness value of the first projection device;
when the actual brightness level is not equal to a reference level of brightness, calculating a difference X between the actual brightness level corresponding to the actual brightness value and the reference level of brightness;
when the actual brightness level is greater than the reference level of brightness, reducing, by the first projection device, a current output to a projection unit of the first projection device for projecting the image by X/N; and when the actual brightness level is less than the reference level of brightness, increasing, by the first projection device, the current output to the projection unit of the first projection device by X/N.

* * * * *